United States Patent [19]

Daniel

[11] 4,378,711
[45] Apr. 5, 1983

[54] PLANETARY MECHANISM HAVING A FLUID BAFFLE

[75] Inventor: Steven A. Daniel, Marquette Heights, Ill.

[73] Assignee: Caterpillar Tractor Co., Peoria, Ill.

[21] Appl. No.: 261,115

[22] PCT Filed: Sep. 29, 1980

[86] PCT No.: PCT/US80/01284
 § 371 Date: Sep. 29, 1980
 § 102(e) Date: Sep. 29, 1980

[87] PCT Pub. No.: WO82/01232
 PCT Pub. Date: Apr. 15, 1982

[51] Int. Cl.³ .................................................. F16H 57/04
[52] U.S. Cl. ........................................ 74/467; 184/6.12; 74/710
[58] Field of Search ............... 74/467, 414, 12, 750 R, 74/606 R, 695, 710; 184/6.12, 11 R, 11 B, 13 R

[56] References Cited

U.S. PATENT DOCUMENTS

| | | | |
|---|---|---|---|
| 1,220,810 | 3/1917 | Alquist | 74/467 |
| 1,220,811 | 3/1917 | Alquist | 74/467 |
| 1,483,830 | 2/1924 | Moore | 184/11 R |
| 1,544,081 | 9/1925 | Garrett | 184/6.12 |
| 2,968,190 | 1/1961 | Orr | 74/467 |
| 3,091,131 | 5/1963 | McNally | 74/606 |
| 3,182,527 | 5/1965 | Bryan | 74/713 |
| 3,407,902 | 10/1968 | Musser | 74/467 |
| 3,529,698 | 9/1970 | Nelson | 184/6.12 |
| 3,539,035 | 11/1970 | Wolkenstein | 74/467 |
| 3,618,711 | 11/1971 | Vollmer | 184/6.12 |
| 3,625,310 | 12/1971 | Herrick | 184/6.12 |
| 4,227,427 | 10/1980 | Dick | 74/167 |
| 4,231,266 | 11/1980 | Nishikawa et al. | 74/467 |

*Primary Examiner*—Lawrence J. Staab
*Attorney, Agent, or Firm*—Charles E. Lanchantin, Jr.

[57] ABSTRACT

A baffle (78) encircles a planetary mechanism (10) having a ring gear element (18), a sun gear element (20), a planet carrier element (22) and a plurality of planet gear elements (24), and is connected to a stationary support (30, 48, 50, 66). The baffle (78) includes wiping means (90) for wiping fluid from one of the elements (18, 20, 22, 24) in response to rotation thereof and directing fluid that would otherwise cause high drag losses radially away from the planetary mechanism (10).

16 Claims, 3 Drawing Figures

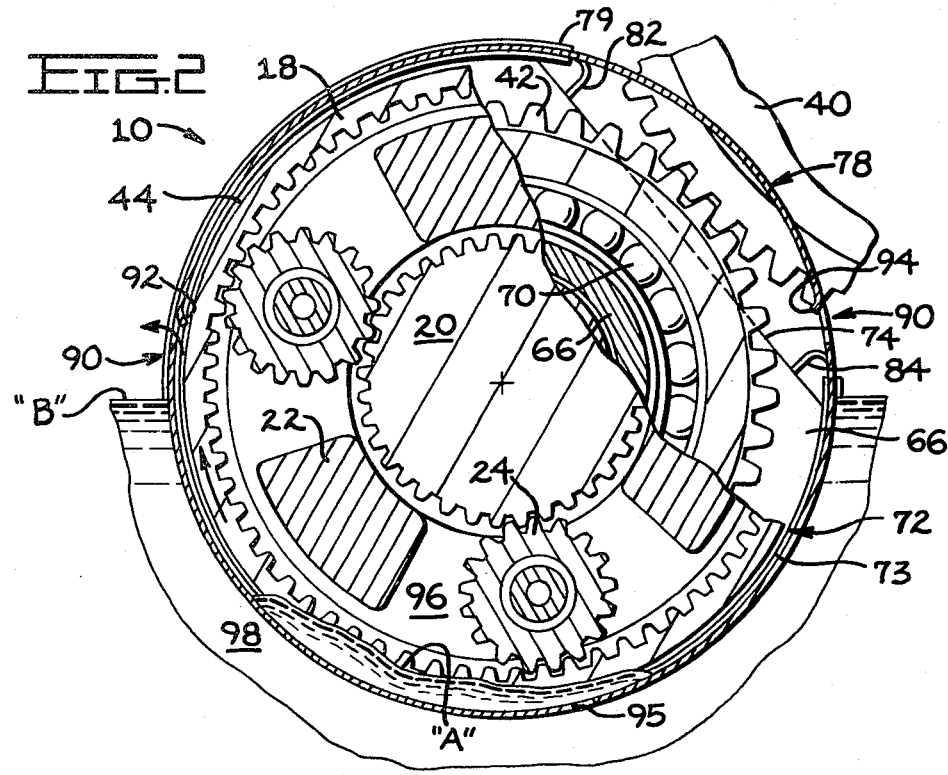
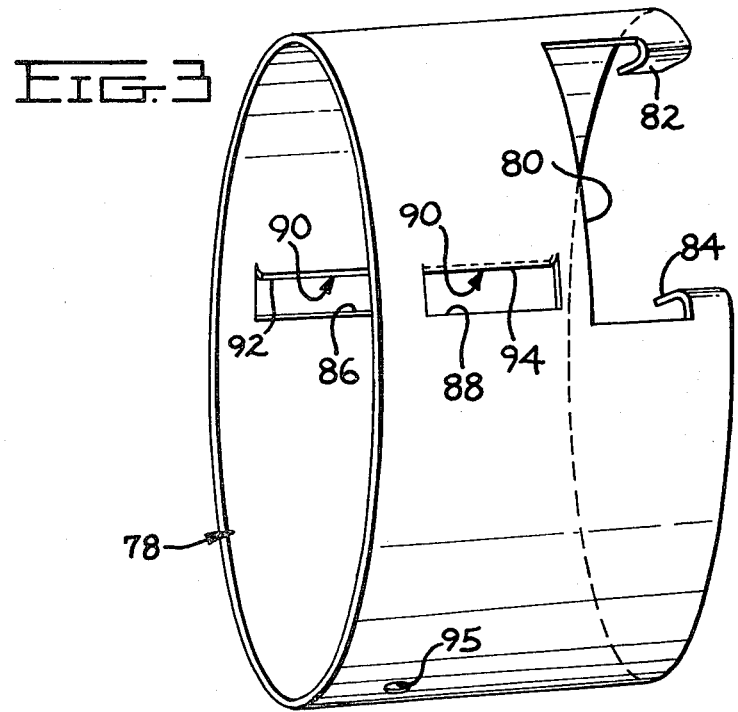

PLANETARY MECHANISM HAVING A FLUID BAFFLE

DESCRIPTION

1. Technical Field

This invention relates generally to a planetary mechanism, and more particularly to a device for reducing the drag losses due to fluid churning by the elements of the planetary mechanism.

2. Background Art

It is well known that it is undesirable to run power train gears in a chamber with an appreciable amount of lubricating fluid therein because of the horsepower losses that are incurred by the action of the rotating elements. Not only does a high fluid level result in a loss in the operational efficiency of the power train, but also the fluid tends to be heated by the churning and to deteriorate more rapidly. Still another disadvantage is that the fluid can become so aerated that it can detrimentally influence the associated control system.

U.S. Pat. No. 1,220,810 to K. Alquist on Mar. 27, 1917 discloses a gear mechanism that overcomes some of these problems by providing an elevated reservoir in the casing to which the lubricating fluid is directed by the tips of the gear teeth pumping against an associated casing wall. In other words, the gear teeth tips extend into a lower fluid reservoir to a limited extent, and a relatively low-fluid level is maintained therein by the action of the teeth tips as they sweep upwardly adjacent the casing wall.

Although the above-mentioned patent describes a mechanism that can be very effective in reducing fluid drag, it requires a complex case or housing construction and is not conveniently adaptable to the typical planetary gear mechanisms found in a vehicle for example. In the usual vehicle space is at a premium, and there are so many elements to lubricate that it is difficult to economically distribute the fluid to them while simultaneously maintaining different fluid levels in the desired regions for minimal drag.

The present invention is directed to overcoming one or more of the problems as set forth above.

DISCLOSURE OF THE INVENTION

In one aspect of the present invention a baffle is connected to a support in generally encircling relationship to a planetary mechanism having the usual plurality of rotating elements, and the baffle advantageously includes means for wiping fluid from one of the elements in response to rotation thereof and for directing the fluid away from the planetary mechanism.

Specifically, the present invention includes an economical sheet metal baffle of generally cylindrical construction that has an opening therein and a fluid wiping lip located at the opening. Upon rotation of one of the elements of the planetary mechanism located within the baffle fluid is urged upwardly toward the lip, whereupon the lip directs the fluid radially outwardly away from the planetary mechanism so that fluid drag losses and aeration problems are minimized.

BRIEF DESCRIPTION OF THE DRAWINGS

FIG. 2 is a diagrammatic, transverse sectional view of the planetary mechanism of FIG. 1 as taken along line II—II thereof.

FIG. 3 is a diagrammatic, perspective elevational view of the fluid baffle illustrated in FIGS. 1 and 2.

BEST MODE FOR CARRYING OUT THE INVENTION

Figure 1:
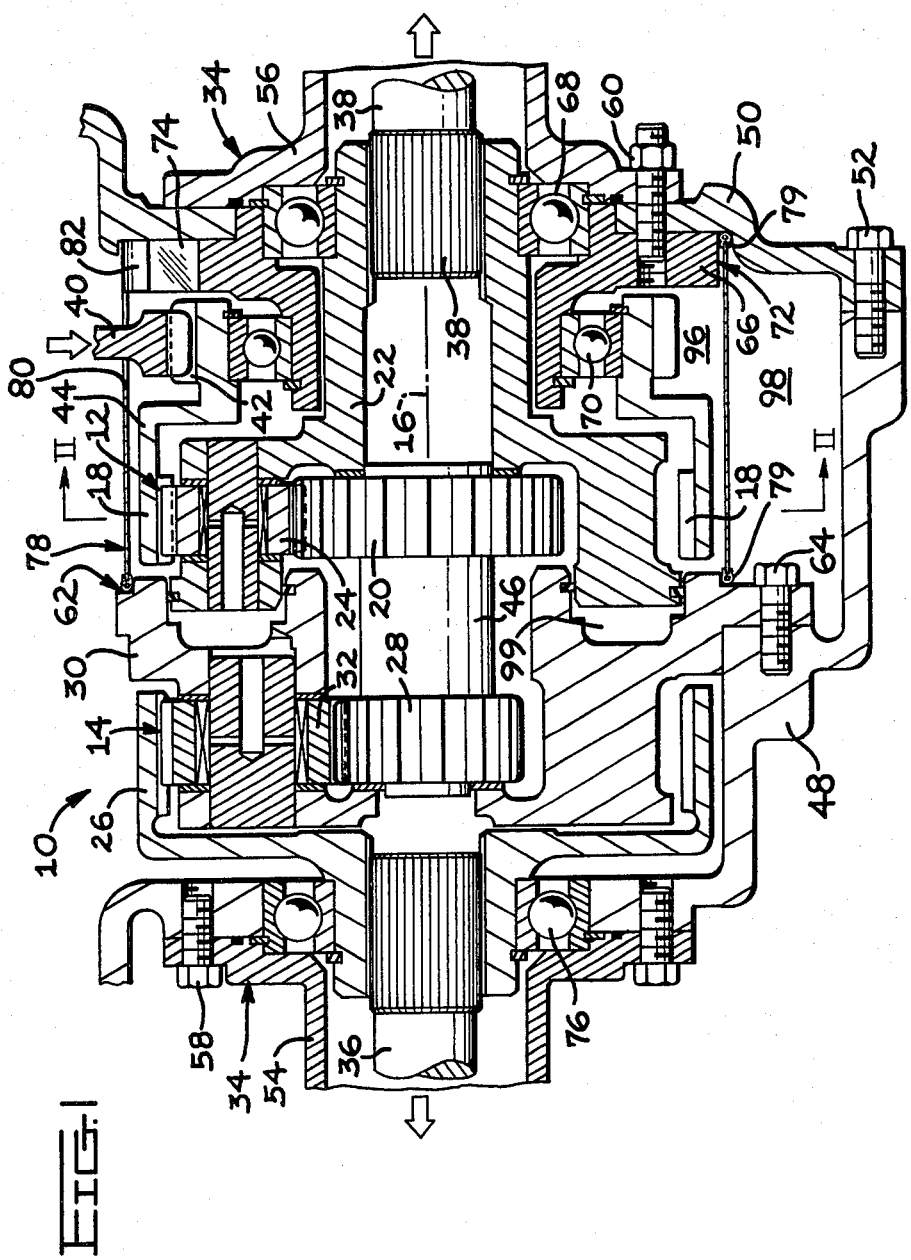
FIG. 1 is a diagrammatic, elevational sectional view of a planetary mechanism as taken along the central axis thereof, the planetary mechanism having a fluid baffle and being constructed in accordance with the present invention.

A planetary mechanism 10 is shown in FIG. 1 as having first and second planetary sets 12 and 14 arranged along a common central axis 16. The first planetary set 12 includes ring gear, sun gear and planet carrier elements 18, 20 and 22 of the usual type wherein a plurality of planet gears 24 are rotatably mounted on the carrier element and are in intermeshing engagement with the ring gear and sun gear elements. Likewise, the second planetary set 14 includes ring gear, sun gear and planet carrier elements 26, 28 and 30, and a plurality of planet elements 32 rotatably mounted in spaced peripheral relationship on the carrier element.

In the instant example the planetary mechanism 10 serves as a vehicle differential with the central axis 16 being disposed normal to the usual forward and reverse direction of vehicle travel. A cross drive housing or stationary support means 34 serves to contain and rotatably support the planetary mechanism, such that a first or left output member 36 and a second or right output member 38 are adaptable to drive the opposite wheels of the vehicle, not shown. A driving input gear 40 is in meshing engagement with a driven input gear 42 for powering the mechanism.

More specifically, the driven input gear 42 is integrally connected to the first ring gear element 18, and the common body thereof defines a cylindrical outer wall surface 44 of a preselected diameter. As is also illustrated in FIG. 1, the first planet carrier element 22 is releasably connected to the right output member 38, the second ring gear element 26 is releasably connected to the left output member 36, and the first and second sun gear elements 20 and 28 are integrally connected by a common body or shaft 46.

In the instant embodiment, the stationary support means 34 includes first and second main casing members 48 and 50 releasably connected together by a plurality of fasteners 52, and first and second tubular extension members 54 and 56 releasably connected to the main casing members 48 and 50 by fasteners 58 and 60 respectively. The second planet carrier element 30 has piloting seat means or a cylindrical piloting seat 62 and is releasably connected to the first main casing member 48 by a plurality of fasteners 64. In essence, the second planet carrier element 30 serves as a stationary support for certain other rotating members of the planetary mechanism 10.

On the right side when viewing FIG. 1 a bearing support member 66 is releasably connected to the second main casing member 50. The bearing support member provides a mounting for first and second bearing assemblies 68 and 70 which rotatably support the first planet carrier element 22 and the first ring gear element 18 and integral input gear 42 respectively. As is shown best in FIG. 2, the bearing support member 66 defines seat means 72 including a cylindrical outer surface portion 73 and an inclined planar surface 74 intersectingly connected to the cylindrical surface portion 73 and oriented at a preselected angle of inclination.

On the left side when viewing FIG. 1 is a third bearing assembly 76 supported by the first casing member 48 and the first tubular extension member 54. In turn, the second ring gear element 26 and left output member 36 are rotatably supported by the third bearing assembly.

Advantageously, a fluid baffle 78 of generally cylindrical construction is provided which extends between the stationary second planet carrier element 30 and the stationary bearing support member 66. Specifically, the baffle is loosely but relatively closely mounted on the piloting seat means 62 on the left side and is loosely but relatively closely mounted on the positioning seat means 72 on the right side. Preferably, an elastomeric edge seal 79 extends axially from each of the opposite peripheral edges of the baffle for sealing engagement with the respective piloting and positioning seat means.

Referring now to FIGS. 2 and 3, the baffle 78 is preferably of thin sheet metal, for example 2 mm (0.079") thick, which is formed basically into a hollow cylinder. A passage 80 is defined in the baffle to permit the driving input gear 40 to extend therethrough and into engagement with the driven input gear 42, and first and second inwardly deformed positioning tangs 82 and 84 are formed in the baffle adjacent the passage.

In accordance with a major aspect of the invention, the light-weight baffle 78 defines first and second generally diametrically opposed openings 86 and 88 and wiping means 90 for wiping fluid from one of the rotating elements of the planetary mechanism 10 and directing it radially outwardly and away therefrom. Such wiping means includes first and second wiping lips 92 and 94 disposed adjacent the openings 86 and 88 respectively, and which lips are individually effective in a single direction of rotation of the first ring gear element 18. A drain port (95) of limited size, for example less than 5 mm (0.197") diameter, is useful for draining fluid from within the baffle during servicing and prior to disassembly of the planetary mechanism.

INDUSTRIAL APPLICABILITY

The assembly of the planetary mechanism 10 and the baffle 78 is a relatively simple matter as may be recognized with reference to FIG. 1. The second ring gear element 26 is initially inserted into the bearing assembly 76 and locked in place. A subassembly, including the second planet carrier element 30 and the planet gears 32 is slipped into the ring gear element 26 and the second planet carrier element secured to the first casing member 48 by screw-threaded installation of the fasteners 64. Thereafter, the sun gear elements 20,28 and connecting shaft 46 are dropped into position and a second subassembly including the first planet carrier element 22 and the planet gears 24 set in place. Then a third subassembly including the first ring gear element 18, bearing support member 66 and the bearing assemblies 68 and 70 is slipped onto the planet gears 24 and onto the output end of the first planet carrier element 22 where it is locked in position. The baffle 78 is subsequently axially installed upon the piloting seat means 62 and over the positioning seat means 72 such that the bent tabs or tangs 82,84 fit closely over the flat surface 74 thereof and nonrotatably support the baffle at the desired angular attitude. Thereafter, the second casing member 50 and second tubular extension member 56 can be installed.

As best seen in FIG. 2, the baffle 78 effectively encircles the mid portion of the planetary mechanism 10 and defines with the fixed and opposite supporting members 30 and 66 an internal chamber 96. Outside of the baffle, and within the main casing members 48 and 50 is an external chamber 98. As is schematically illustrated, the operational relationship of the baffle and planetary mechanism is such as to maintain a preselected fluid level "A" within the internal chamber at a substantially lower elevation than the fluid level "B" in the external chamber as is indicated by the letters in the drawing.

Because the baffle 78 encircles the planetary mechanism 10, it minimizes fluid entry into the internal chamber 96 from above. Particularly, fluid splashes down upon the planetary mechanism from the associated portions of the power train, not illustrated. The baffle is primarily used to remove lubricating fluid that enters the internal chamber 96 from within the baffle. Lubricating fluid is introduced through the stationary second planet carrier element 30 into a centrally located lubrication chamber 99 defined between the internested first and second planet carrier elements 22,30 and as is shown in FIG. 1. From the lubrication chamber the fluid is directed to the planet gear bearings and remaining portions of the planetary mechanism in the usual manner.

In operation, and as best illustrated in FIG. 2, the lower fluid level "A" in the internal chamber 96 is achieved by the advantageous close radial relationship of the wiping means 90 of the baffle 78 and the rotating cylindrical surface 44 of the first ring gear element 18. For example, the preferred radial clearance is about 2 mm (0.079") thereat. Assuming that the first ring gear element is rotating at a speed of about 1500 rpm in a clockwise direction when viewing FIG. 2, then the juxtaposed relationship of the baffle and surface 44 relative to the left lip 92 causes the upwardly moving fluid thereat to be redirected radially outwardly through the opening 86 by the wiping action of the lip. It can be appreciated that the right lip 94 is effective when the first ring gear element rotates in a counterclockwise direction. As can be appreciated, the edge seals 79 need not extend fully around the peripheral edges of the baffle. However, the seals should extend around the edges through at least the lower half of the baffle up to the elevation of the openings 86,88 in order to minimize fluid leakage.

If the driven input gear 42 were larger in diameter than the cylindrical outer wall surface 44 the fluid baffle could be closely radially spaced thereto. The teeth of the driven input gear would serve as paddle wheels and in association with the slightly axially repositioned lips 92,94 could be more effective. In such alternate construction the driven input gear 42 would still be acting as one element of the planetary mechanism 10 since it is connected for joint rotation with the planet carrier element 22. On the other hand, it is further contemplated that the cylindrical outer wall surface 44 can be provided with a plurality of gear teeth or splines, not shown, for improved operational cooperation with the wiping lips 92,94.

Thus, a fluid baffle is provided for a planetary mechanism which is of lightweight and economical construction, can be easily assembled, and is effective to reduce the fluid drag losses due to fluid churning by certain ones of the rotating elements of the planetary mechanism and by lowering the fluid level in the region generally disposed within the baffle.

Other aspects, objects and advantages of this invention can be obtained from a study of the drawings, the disclosure and the appended claims.

What is claimed is:

1. In a planetary mechanism (10) of the type having a stationary support (30,48,50,66), a ring gear element (18), a sun gear element (20), a planet carrier element (22), and a plurality of planet gear elements (24) rotatably mounted on the planet carrier element (22) and in meshing engagement with the sun gear element (20) and the ring gear element (18), the elements (18,20,22,24) being rotatably connected to the stationary support (30,48,50,66), the improvement comprising:

a baffle (78) encircling the elements (18,20,22,24) of the planetary mechanism (10) and defining with the support (30,48,50,66) an internal chamber (96) and an external chamber (98), the baffle (78) including an opening (86/88) and wiping means (90) for wiping fluid from one of the elements (18,20,22,24) of the planetary mechanism (10) and directing fluid from the internal chamber (96) to the external chamber (98) through the opening (86/88) and reducing the fluid level within the internal chamber (96) in response to rotation of the one element (18,20,22,24).

2. The planetary mechanism (10) of claim 1 wherein the baffle (78) is of sheet material formed into a hollow cylinder.

3. The planetary mechanism (10) of claim 2 wherein the wiping means (90) includes a radially inwardly extending lip (92/94) located at the opening (86/88).

4. The planetary mechanism (10) of claim 2 wherein the support (30,48,50,66) includes piloting seat means (62) for loosely supporting the baffle (78).

5. The planetary mechanism (10) of claim 2 wherein the support (30,48,50,66) includes positioning seat means (72) for supporting the baffle (78) at a preselected angular attitude.

6. The planetary mechanism (10) of claim 1 including seal means (79) for sealing between the baffle (78) and the support (30,48,50,66).

7. The planetary mechanism (10) of claim 1 wherein the baffle (78) is of sheet metal and of hollow cylindrical form.

8. The planetary mechanism (10) of claim 7 wherein the baffle (78) has opposite peripheral edges and a seal (79) connected to each of the edges.

9. The planetary mechanism (10) of claim 7 wherein the baffle (78) has another opening (86/88) and the wiping means (90) includes first and second wiping lips (92,94) located at the respective opening (86/88) and being individually effective in a single direction of rotation of the one element (18,20,22,24).

10. The planetary mechanism (10) of claim 1 wherein the one element (18, 20, 22, 24) is the ring gear element (18).

11. The planetary mechanism (10) of claim 1 wherein the baffle (78) has a passage (80) therethrough and first and second inwardly deformed positioning tangs (82, 84) adjacent the passage (80).

12. In a planetary mechanism (10) of the type having a stationary support (30,48,50,66), a ring gear element (18), a sun gear element (20), a planet carrier element (22), and a plurality of planet gear elements (24) rotatably mounted on the planet carrier element (22) and in meshing engagement with the sun gear element (20) and the ring gear element (18), the elements (18,20,22,24) being rotatably connected to the stationary support (30,48,50,66), the improvement comprising:

a baffle (78) encircling the elements (18,20,22,24) of the planetary mechanism (10) and defining with the support (30,48,50,66) an internal chamber (96) and an external chamber (98), the baffle (78) including an opening (86/88) therethrough and a lip (92/94) located at the opening (86/88) of a construction sufficient for directing fluid radially away from the planetary mechanism (10) and internal chamber (96) to the external chamber (98) in response to rotation of the ring gear element (18).

13. The planetary mechanism (10) of claim 12 wherein the baffle (78) is of hollow cylindrical form.

14. The planetary mechanism (10) of claim 13 wherein the support (30, 48, 50, 66) includes first and second spaced apart members (30, 66) and the baffle (78) is supported by the spaced apart members (30, 66).

15. The planetary mechanism (10) of claim 14 wherein the spaced apart members (30, 66) include means (62, 72, 74) for pilotably and loosely supporting the baffle (78) at a preselected angular attitude.

16. The planetary mechanism (10) of claim 14 including a pair of seals (79) connected to the baffle (78) and individually sealingly engaging one of the spaced apart members (30,66).

* * * * *